(12) United States Patent
Huang

(10) Patent No.: US 8,749,200 B2
(45) Date of Patent: Jun. 10, 2014

(54) CHARGING DEVICE

(75) Inventor: Mao-Hsiang Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/310,811

(22) Filed: Dec. 5, 2011

(65) Prior Publication Data

US 2013/0105657 A1  May 2, 2013

(30) Foreign Application Priority Data

Oct. 31, 2011 (TW) .............................. 100139531 A

(51) Int. Cl.
  *H02J 7/00* (2006.01)
(52) U.S. Cl.
  USPC ........................ 320/115; 361/727; 248/346.04
(58) Field of Classification Search
  USPC ................. 248/346.04, 346.01, 188.1, 188.8, 248/205.1, 220.21, 229.12, 229.22, 231.41, 248/309.1, 316.1, 316.4, 346.07, 36.1; 455/575.1, 90; 379/454, 455; 320/107, 320/128, 114, 115; 361/679.01, 727
  See application file for complete search history.

(56) References Cited

U.S. PATENT DOCUMENTS

| | | | | |
|---|---|---|---|---|
| 6,665,524 B1 * | 12/2003 | Niemann | ................... | 455/575.6 |
| 7,158,092 B2 * | 1/2007 | Shen | ............................. | 343/878 |
| 7,401,755 B2 * | 7/2008 | Wu | ......................... | 248/346.07 |
| 7,888,908 B2 * | 2/2011 | Kuo | ............................. | 320/108 |
| 7,919,948 B2 * | 4/2011 | Kikuchi | ....................... | 320/115 |
| 8,136,780 B2 * | 3/2012 | Lin | ........................... | 248/316.4 |
| 2007/0237539 A1 * | 10/2007 | Raff et al. | ...................... | 399/90 |
| 2008/0019082 A1 * | 1/2008 | Krieger et al. | ................ | 361/679 |
| 2009/0051563 A1 * | 2/2009 | Kuo et al. | ..................... | 340/825 |
| 2009/0267559 A1 * | 10/2009 | Toya et al. | ..................... | 320/108 |
| 2010/0173674 A1 * | 7/2010 | Fujii et al. | ..................... | 455/557 |
| 2010/0315041 A1 * | 12/2010 | Tan | ................................ | 320/115 |

FOREIGN PATENT DOCUMENTS

CN             201360029 Y     12/2009

* cited by examiner

*Primary Examiner* — Todd M Epps
(74) *Attorney, Agent, or Firm* — Novak Druce Connolly Bove + Quigg LLP

(57) ABSTRACT

A charging device includes a base part a movable part connected by a connection part. The base part includes a sliding rail that defines a first position and a second position. The charging device further includes a sliding element, which includes a sliding end and a fixed end. The sliding end is placed into the sliding rail and capable of sliding along the sliding rail. The fixed end is fixed to the connection part. When the sliding end is positioned in the first position of the sliding rail, the charging device is closed. When the sliding end slides along the sliding rail to the second position of the sliding rail, the base part and the movable part is slid away to open the charging device.

12 Claims, 6 Drawing Sheets

CHARGING DEVICE

BACKGROUND

1. Technical Field

The present disclosure relates to a charging device.

2. Description of Related Art

Charging devices are often integrated into one piece, when placing a battery in a charging device, the user needs to press the battery into the charging device. When taking the battery from the charging device, the user has to pry from one end of the battery to take it out from the charging device. Therefore, it is difficult to place the battery into the charging device or taking the battery from the charging device.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
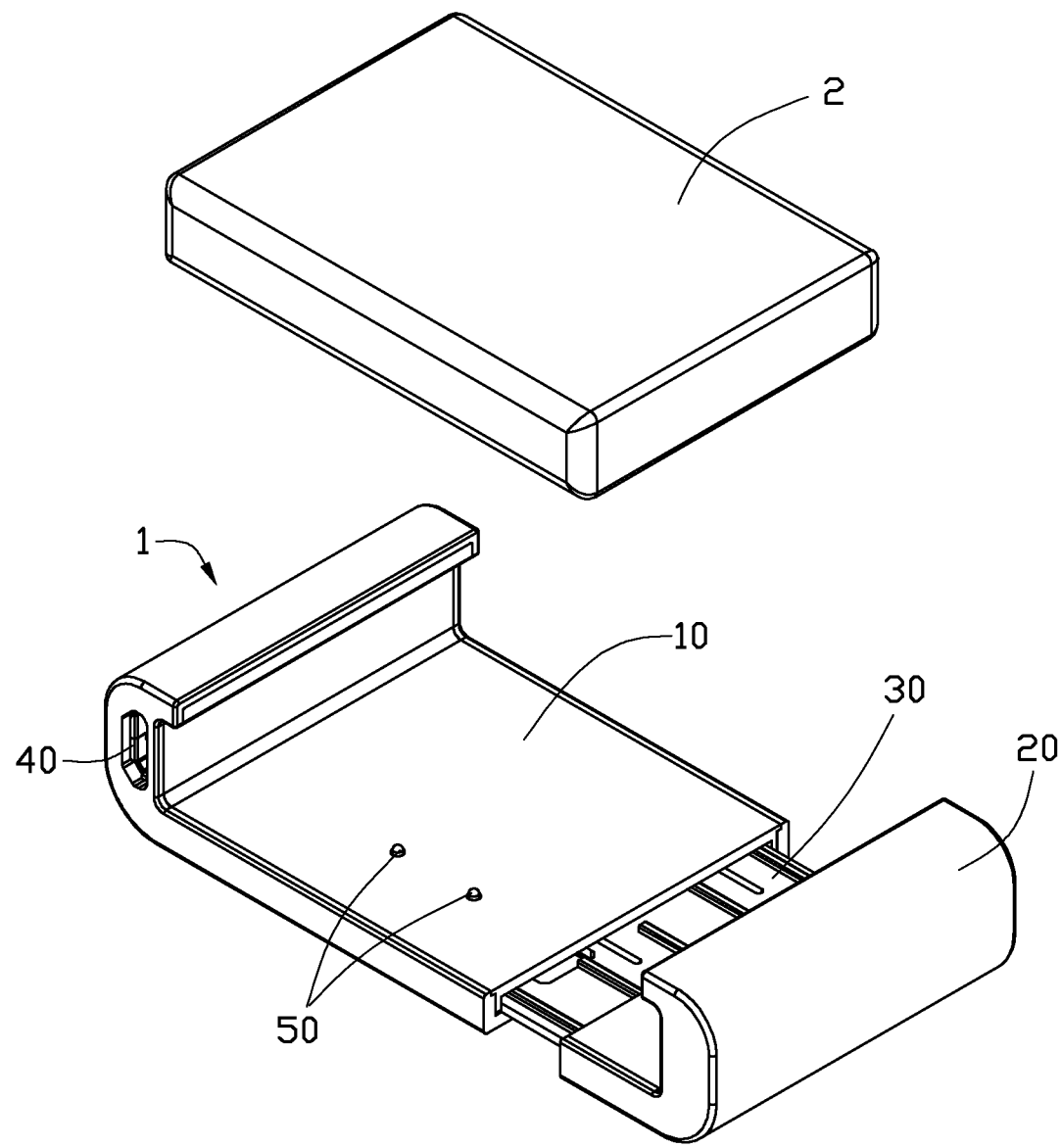
FIG. 1 is an isometric view of a charging device with in accordance with an exemplary embodiment.

Referring to FIG. 1, a charging device 1 includes a base part 10 and a movable part 20. The movable part 20 is connected to the base part 10 through a connection part 30. The connection part 30 and the movable part 20 are integrated into one. The connection part 30 is a panel and slidably connected to the base part 10. In the embodiment, the base part 10 and the movable part 20 both are substantially L-shaped.

The base part 10 includes a charging interface 40 and charging contacts 50. The base part 10 and the movable part 20 are departed when the connection part 30 slides away from the base part 10. The battery 2 can be placed into the charging device 1, or can be taken out from the charging device 1 when the movable part 20 is slid away from the base part 10. When the battery 2 is placed into the base part 10, an external force on the movable part 20 makes the connection part 30 slide to the base part 10 to close the charging device 1.

Figure 2:
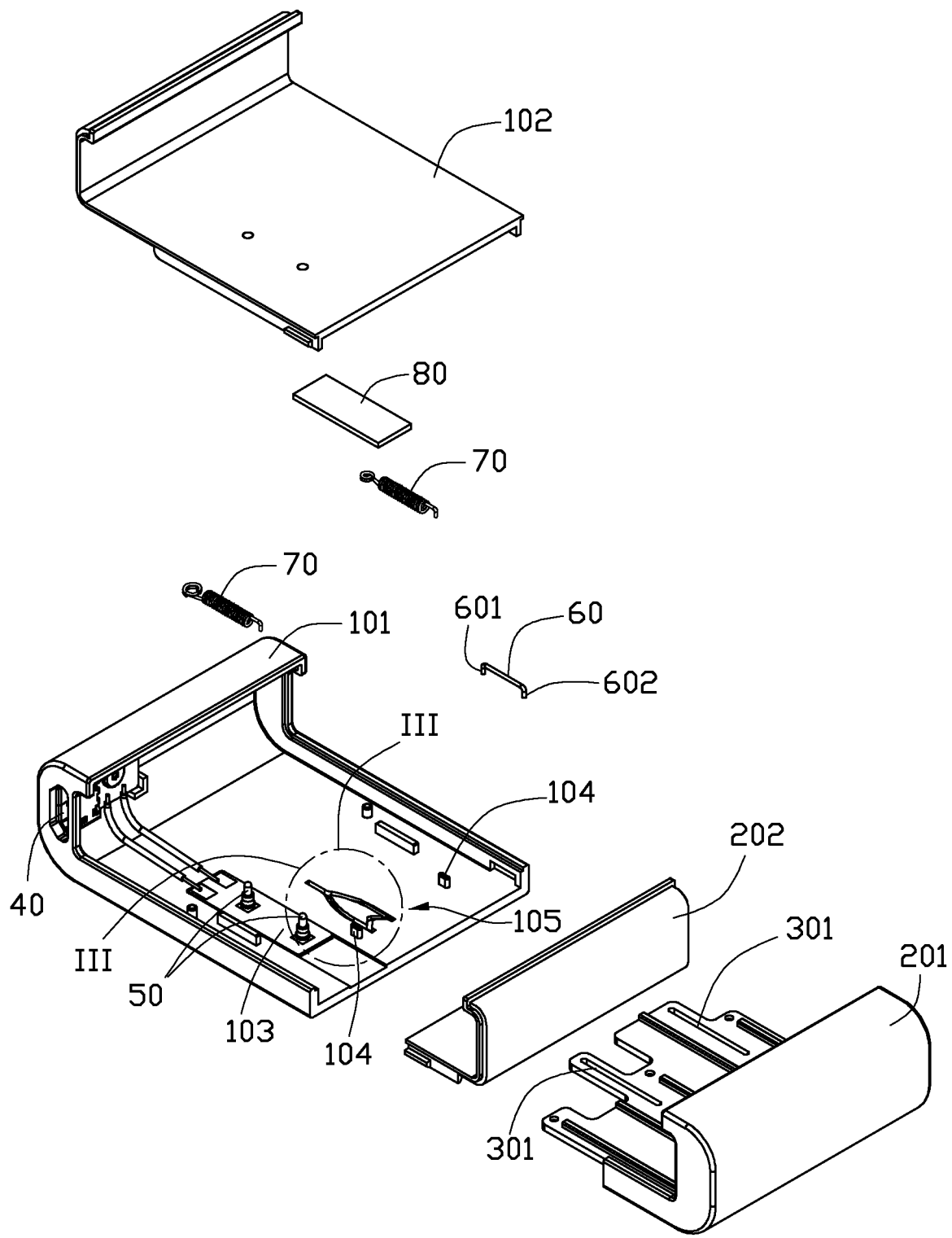
FIG. 2 is an exploded view of the charging device of FIG. 1.

Referring to FIG. 2, the base part 10 includes a first housing 101 and a first insulator 102 that covers the first housing 101. A charging integrated circuit (IC) 103 is positioned between the first housing 101 and the first insulator 102, and is connected to the charging interface 40. The contacts 50 are connected to the charging IC 103, and pass through the first insulator 102 to connect to the battery 2.

The movable part 20 includes a second housing 201 and a second insulator 202 that covers the second housing 201.

In the embodiment, the first housing 101 defines two protrusions 104, and the connection part 30 defines two slots 301. The two protrusions 104 are placed into the two slots 301 respectively to allow the two slots 301 to slide along the two protrusions 104. Thereby the connection part 30 is slidably connected to the base part 10.

Figure 3:
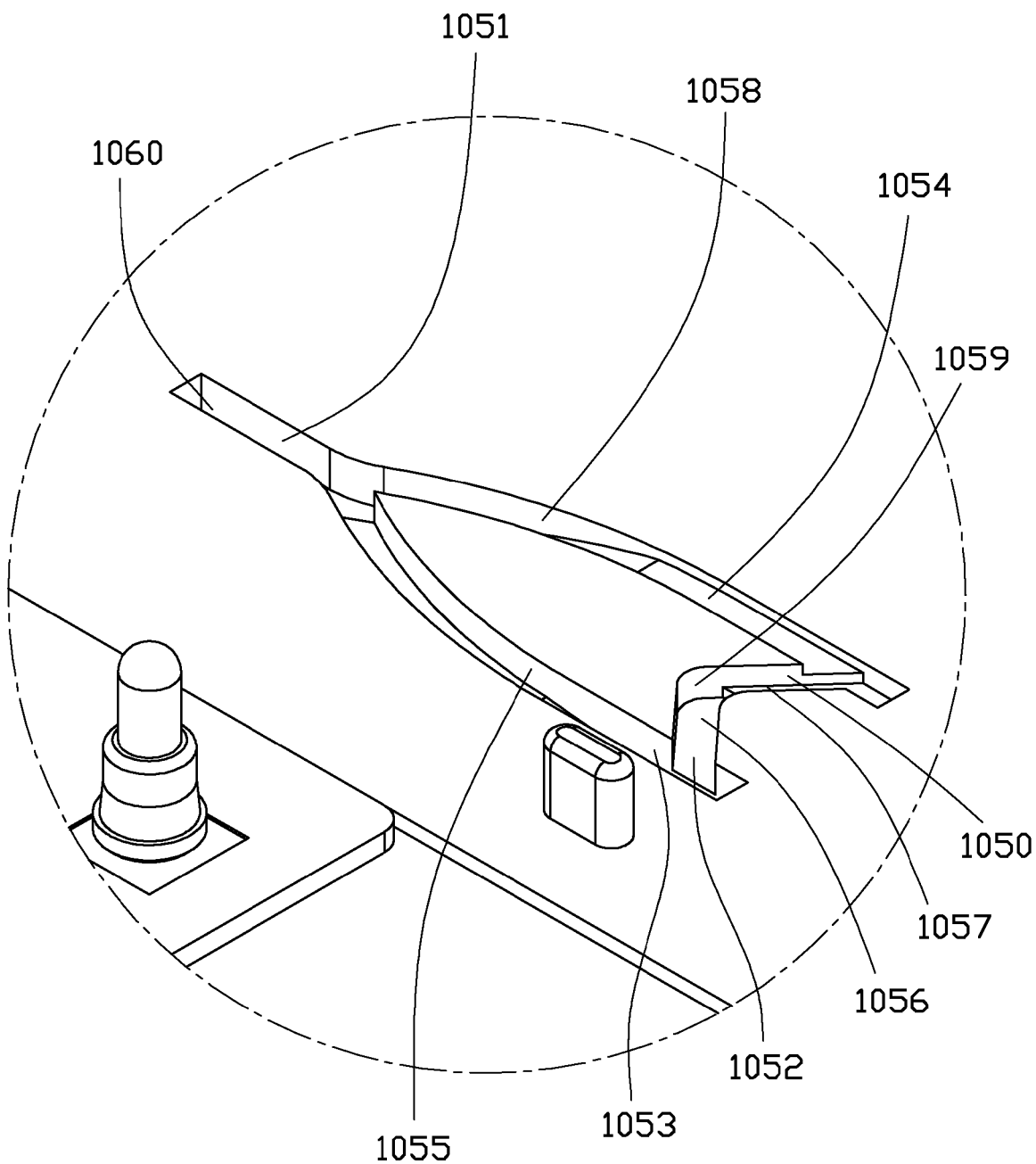
FIG. 3 is an enlarged view of circled portion I in FIG. 2.

Referring to FIGS. 2 and 3, the first housing 101 further defines a sliding rail 105 on an inner surface, which is covered by the first insulator 102. The sliding rail 105 is a groove with a closed, substantially heart-shaped configuration. The sliding rail 105 defines a first portion 1051, extending out at the tip of the heart, a second portion 1052 and a third portion 1050, connected and curved at a second position 1059, are opposite to the first portion 1051, a fourth portion 1053 connecting the first portion 1051 and the second portion 1052, and a fifth portion 1054 connecting the first portion 1051 and the third portion 1050. A rail along the first portion 1051 and the fourth portion 1053 is defined as a first rail 1055. The first portion 1051 further defines a first position 1060 at the end of the first rail 1055. A rail along the second portion 1052 is defined as a second rail 1056. A rail along the third portion 1050 is defined as a third rail 1057. A rail along the fifth portion 1056 and the first portion 1051 is defined as a fourth rail 1058. The bottoms of the four rails 1055, 1056, 1057 and 1058 are not on a same plane. In the embodiment, the bottom of the first rail 1055 is higher than that of the second rail 1056.

The bottom of the second rail 1056 is higher than that of the third rail 1057. The bottom of the third rail 1057 is higher than that of the fourth rail 1058.

The charging device 1 further includes a sliding member 60 which is substantially U-shaped. The sliding member 60 includes a sliding end 601 and a fixed end 602. The sliding end 601 is placed into the sliding rail 105 and is capable of sliding along the sliding rail 105. The fixed end 602 is fixed to the connection part 30. In this embodiment, the sliding member 60 is made of metal.

Figure 4:
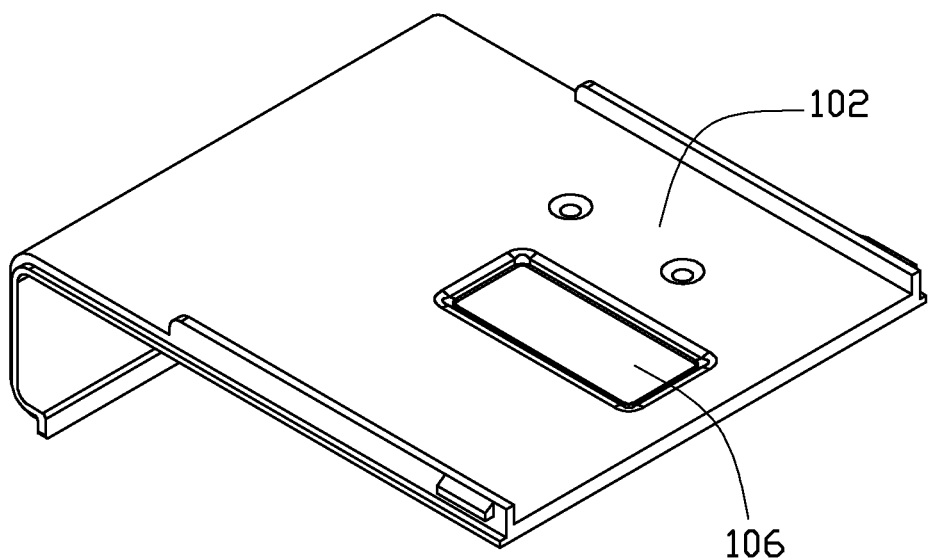
FIG. 4 is an isometric view of a first insulator included in the charging device of FIG. 1.

Referring to FIG. 4, a cushion 80 is placed into a hollow 106 defined in a surface, that covers the first housing 101, of the first insulator 102. The cushion 80 is made of elastic material and covers the sliding member 60 to prevent the sliding element 60 from coming out of the sliding rail 105. In the present embodiment, the cushion 80 is made of rubber.

The charging device 1 further includes two elastic elements 70. One end of each of the two elastic elements 70 is connected to the first housing 101. The other end of each of the two elastic elements 70 is connected to the connection part 30. The two elastic elements 70 are respectively positioned on two sides of the sliding rail 105. In this embodiment, the elastic elements 70 are springs.

Figure 5:
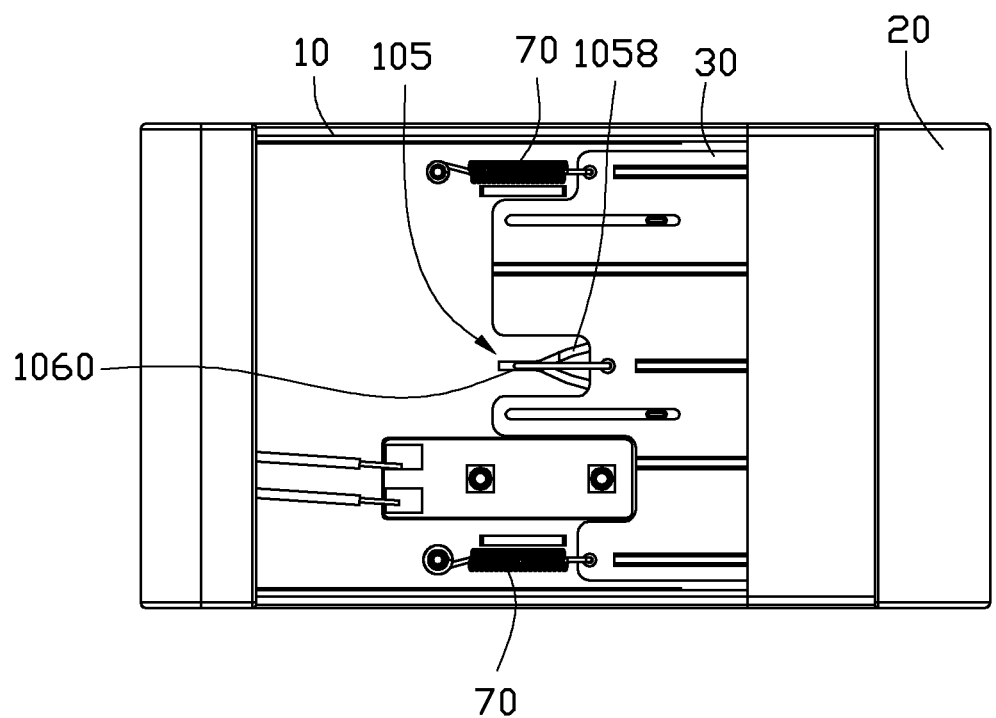
FIG. 5 is a plan view of a sliding element positioned in a first state in a sliding rail when the charging base of FIG. 1 is closed.
Figure 6:
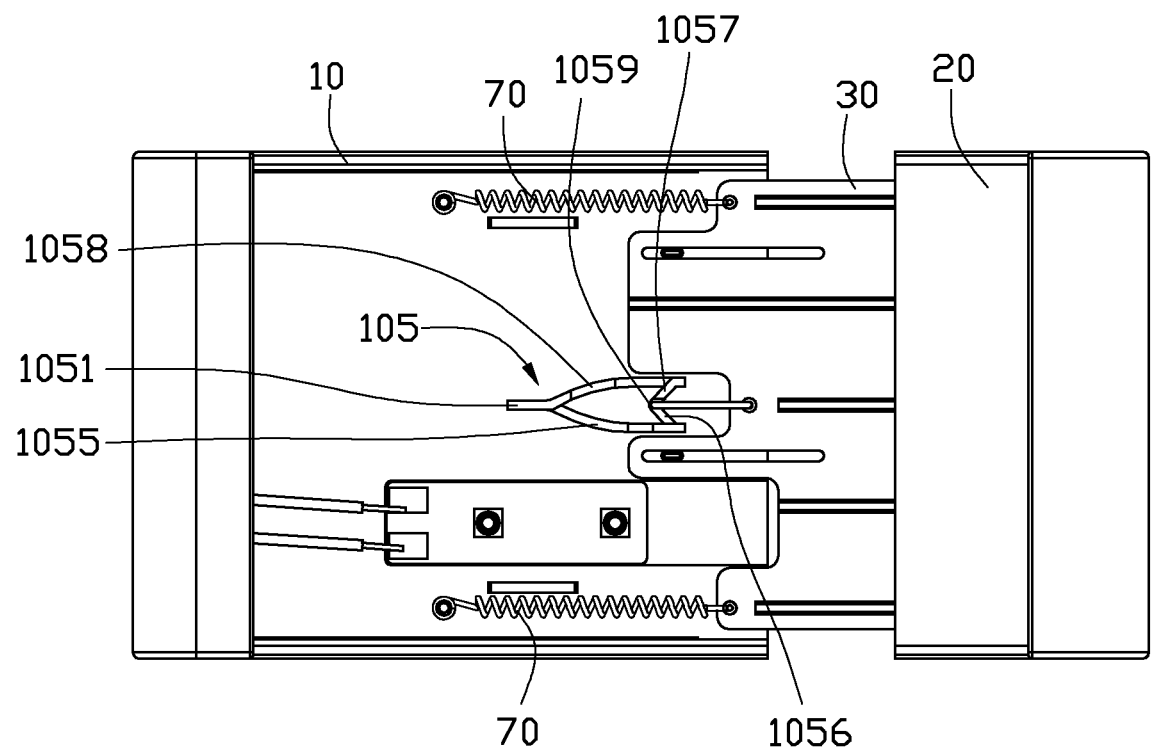
FIG. 6 is a plan view of a sliding element positioned a second state in the sliding rail when the charging base of FIG. 1 is opened.

Referring to FIGS. 5 and 6, if the charging base 1 is closed, the siding end 601 of the sliding element 60 is positioned and supported at the first position 1060 of the first rail 1055. If the closed charging base 1 needs to be opened, the connection part 30 slides away from the first housing 101 under the external force. The two elastic elements 70 are deformed to generate elastic force. The sliding end 601 slides along the bottom of the sliding rail 105. When the sliding end 601 falls from the first rail 1055 to the second rail 1056. Because the bottom of the first rail 1055 is higher than that of the second rail 1056, if the external force is released, the sliding end 601 slides along the second rail 1056 to the second position 1059 under the elastic force generated by the two elastic elements 70 and is supported at the second position 1059. Thereby, the base part 10 and the movable part 20 are departed to open the charging device 1.

When the opened charging device 1 needs to be closed, an external force is exerted on the movable part 20, because the bottom of the second rail 1056 is higher than the bottom of the third rail 1057, the sliding end 601 slides along the third rail 1057 and falls to the fourth rail 1058. Because the bottom of the third rail 1057 is higher than that of the fourth rail 1058, the sliding end 601 slides to the first position 1060 of the first rail 1055 along the fourth rail 1058 under the elastic force generated by the elastic elements 70, thereby the charging device 1 is closed.

In this embodiment, as shown in FIG. 3, the first rail 1055, the second rail 1056, the third rail 1057, and the fourth rail 1058 are arranged counter-clockwise to make the sliding end 601 slide along the sliding rail 105 counter-clockwise.

In another embodiment, the first rail 1055, the second rail 1056, the third rail 1057, and the fourth rail 1058 are arranged clockwise to make the sliding end 601 slide along the sliding rail 105 clockwise.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A charging device comprising:
   a base part comprising a sliding rail that defines a first position and a second position;
   a movable part;
   a connection part connecting the movable part to the base part; a sliding element comprising:
      a sliding end being placed to the sliding rail and capable of sliding along the sliding rail; and
      a fixed end being fixed to the connection part; and
   at least one elastic element, two ends of the at least one elastic element being respectively connected to the base part and the connection part, wherein the sliding rail defines a first portion, a second portion, a third portion, a fourth portion, and a fifth portion, the first portion defines the first position, the second portion and the third portion are connected at the second position, the fourth portion connects the first portion and the second portion, the fifth portion connects the first portion and the third portion, a rail along the first portion and the fourth portion is defined as a first rail, a rail along the second portion is defined as a second rail, a rail along the third portion is defined as a third rail, a rail along the fifth portion and the first portion is defined as a fourth rail, bottoms of the four rails are not on a same plane, the bottom of the first rail is higher than that of the second rail, the bottom of the second rail is higher than that of the third rail, the bottom of the third rail is higher than that of the fourth rail;
   wherein when the sliding end positions in the first position of the sliding rail, the charging device is closed, when the sliding end slides along the sliding rail to the second position of the sliding rail, the base part and the movable part are slid away to open the charging device.

2. The charging device as described in claim 1, wherein the sliding rail is a groove with a closed, substantially heart-shaped configuration, the first portion extends out at a tip of the heart-shaped configuration, the second portion and the third portion, curved at the second position, are opposite to the first portion.

3. The charging device as described in claim 1, wherein the first rail, the second rail, the third rail, and the fourth rail are arranged counter-clockwise to make the sliding end slide along the sliding rail counter-clockwise.

4. The charging device as described in claim 1, wherein the first rail, the second rail, the third rail, and the fourth rail are arranged clockwise to make the sliding end slide along the sliding rail clockwise.

5. The charging device as described in claim 1, wherein a number of the at least one elastic element is two, and the two elastic elements are respectively positioned in two sides of the sliding rail.

6. The charging device as described in claim 1, wherein the at least one elastic element is a spring.

7. The charging device as described in claim 1, wherein the sliding element is substantially U-shaped.

8. The charging device as described in claim 1, wherein the base part and the movable part both are substantially L-shaped.

9. The charging device as described in claim 1, wherein the base part defines two protrusions, the connection parts defines two slots, the two protrusions are placed into the two slots respectively to make the two slots slide along the two protrusions to make the connection part is slidably connected to the base part.

10. The charging device as described in claim 1, wherein the sliding element is made of metal.

11. The charging device as described in claim 1, wherein the base part comprises a housing and an insulator, the insulator covers the housing, the sliding rail is defined on the housing, the insulator defines a hollow in a surface of the insulator that covers the housing, and a cushion placed into the hollow is for covering the sliding element to prevent the sliding element coming out of the sliding rail.

12. The charging device as described in claim 11, wherein the cushion is made of rubber.

* * * * *